No. 644,936. Patented Mar. 6, 1900.
P. C. NELSON.
STABLE FORK.
(Application filed Nov. 16, 1899.)
(No Model.)
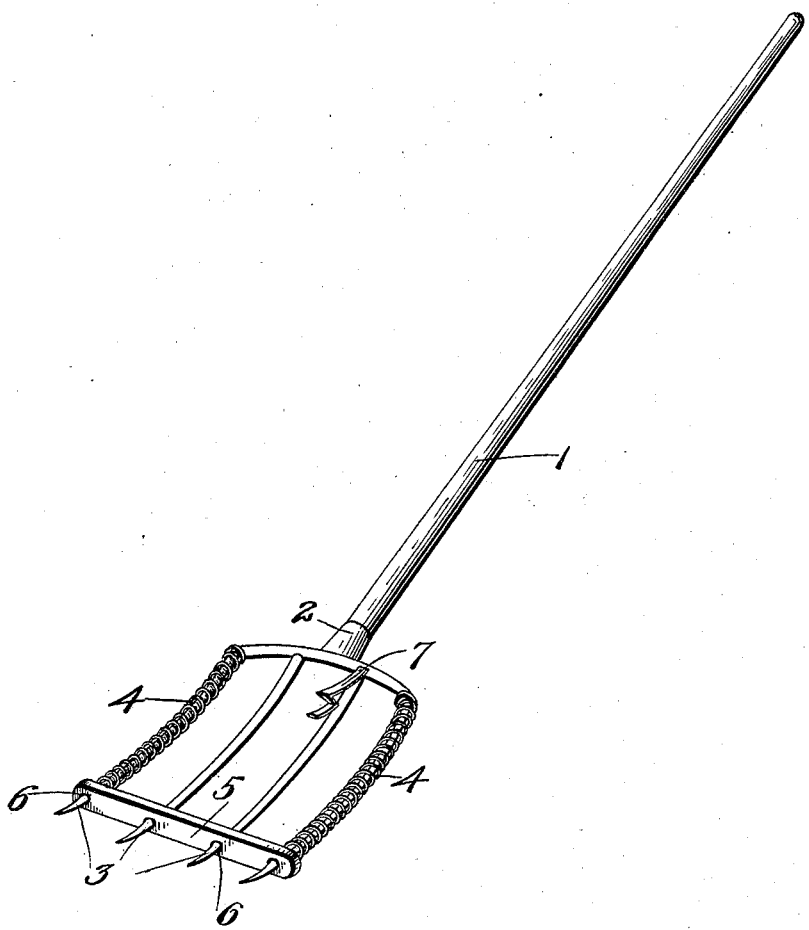
Witnesses
Inventor
Paul C. Nelson
by H. B. Willson & Co.
Attorneys

UNITED STATES PATENT OFFICE.

PAUL C. NELSON, OF KENSINGTON, MINNESOTA.

STABLE-FORK.

SPECIFICATION forming part of Letters Patent No. 644,936, dated March 6, 1900.

Application filed November 16, 1899. Serial No. 737,211. (No model.)

*To all whom it may concern:*

Be it known that I, PAUL C. NELSON, a citizen of the United States, residing at Kensington, in the county of Douglas and State of Minnesota, have invented certain new and useful Improvements in Stable-Forks; and I do declare the following to be a full, clear, and exact description of the invention, such as will enable others skilled in the art to which it appertains to make and use the same.

The invention relates to stable-forks.

The object of the invention is to provide a fork of this character with a spring-actuated clearing-head, whereby the fork will be prevented from clogging.

To this end the invention consists in certain features of construction and combination of parts, which will be hereinafter fully described and claimed.

In the accompanying drawing I have illustrated my invention in perspective.

In the drawing the same reference characters indicate the same parts of the invention.

1 denotes the handle of the fork, 2 its head, and 3 its tines. Two or more of the tines 3 are provided with coil-springs 4, which are connected to a clearing-block 5, provided with holes 6 to receive the tines of the fork. The energy of the springs is exerted to force the clearing-block outward, so that the contents of the fork will not clog up the tines.

When it is desired not to use the clearing-block, the same may be held in its retracted position by the spring-hook 7, carried by one of the tines.

From the foregoing description, taken in connection with the accompanying drawing, the construction, operation, and advantages of the device will be readily understood without requiring an extended explanation.

My invention is simple, may be made at small cost, and is exceedingly well adapted for the purpose for which it is designed, and it will of course be understood that various changes in the form, proportion, and the minor details of construction may be resorted to without departing from the principle or sacrificing any of the advantages of this invention.

Having thus described the invention, what is claimed, and desired to be secured by Letters Patent, is—

A stable-fork comprising a handle, a head and tines, coil-springs encircling two or more of the tines, a clearer-block having holes through which the tines project, said clearer-block being connected to the springs, and a hook carried by one of the tines to engage the clearer-block and hold it in its retracted position, substantially as and for the purpose set forth.

In testimony whereof I have hereunto set my hand in presence of two subscribing witnesses.

PAUL C. NELSON.

Witnesses:
J. P. HEDBERG,
CHRIST NELSEN.